(12) United States Patent
Huston

(10) Patent No.: US 12,134,554 B2
(45) Date of Patent: Nov. 5, 2024

(54) INTERMEDIATE BULK CONTAINER, VALVE AND CONNECTOR SYSTEM

(71) Applicant: ELKHART PLASTICS, INC., South Bend, IN (US)

(72) Inventor: Charles A. Huston, Edwardsburg, MI (US)

(*) Notice: Subject to any disclaimer, the term of this patent is extended or adjusted under 35 U.S.C. 154(b) by 0 days.

(21) Appl. No.: 18/343,494

(22) Filed: Jun. 28, 2023

(65) Prior Publication Data
US 2023/0339739 A1 Oct. 26, 2023

Related U.S. Application Data

(63) Continuation of application No. 17/482,916, filed on Sep. 23, 2021, now Pat. No. 11,713,238.

(60) Provisional application No. 63/081,954, filed on Sep. 23, 2020.

(51) Int. Cl.
*B67D 7/02* (2010.01)
*B67D 7/36* (2010.01)
*F16K 27/06* (2006.01)

(52) U.S. Cl.
CPC ............... *B67D 7/36* (2013.01); *B67D 7/02* (2013.01); *F16K 27/067* (2013.01); *Y02W 30/80* (2015.05)

(58) Field of Classification Search
CPC .......... B67D 7/36; B67D 7/02; F16K 27/067; Y02W 30/80
See application file for complete search history.

(56) References Cited

U.S. PATENT DOCUMENTS

| | | | | |
|---|---|---|---|---|
| 4,372,343 A | * | 2/1983 | Trinkwalder, Jr. | F17C 13/04 222/545 |
| 4,934,654 A | * | 6/1990 | Linnemann | B65D 77/065 251/95 |
| 5,595,217 A | * | 1/1997 | Gillen | F16L 37/373 251/111 |
| 5,673,896 A | * | 10/1997 | Gillen | F16K 27/067 251/315.14 |
| 6,050,545 A | | 4/2000 | Stolzman | |
| 6,364,179 B1 | * | 4/2002 | Sullivan | B67D 3/04 222/130 |

(Continued)

FOREIGN PATENT DOCUMENTS

CA 3093786 A1 10/2019

OTHER PUBLICATIONS

International Search Report and Written Opinion dated Dec. 22, 2021 from PCT/US2021/051729 International Filing Date Sep. 23, 2021; Form PCT/ISA/220, Form PCT/ISA/210, and Form PCT/ISA/237; Harry Kim, Authorized Officer, 19 pages.

*Primary Examiner* — Frederick C Nicolas
(74) *Attorney, Agent, or Firm* — Vorys, Sater, Seymour and Pease LLP; Mark A. Watkins

(57) ABSTRACT

An intermediate bulk container, valve and connector system is provided that includes a split nut connector. The split nut connector is rotatably mounted on a valve adapter plate which connects with the valve, and is internally threaded for engagement with external threads on the intermediate bulk container outlet. An o-ring seal is aligned and positioned between the adaptor plate inlet and intermediate bulk container outlet by positioning surfaces to provide compression and sealing between the component engaging surfaces, and sealing contact is provided between corresponding surfaces of the components.

19 Claims, 11 Drawing Sheets

(56) References Cited

U.S. PATENT DOCUMENTS

| | | | |
|---|---|---|---|
| 6,550,495 B1 * | 4/2003 | Schulze | F16K 17/38 |
| | | | 137/457 |
| 6,619,316 B2 * | 9/2003 | Wiechers | F16K 15/04 |
| | | | 137/533 |
| 6,971,633 B2 * | 12/2005 | Gillen | F16K 5/0642 |
| | | | 251/315.1 |
| 8,312,889 B2 | 11/2012 | Oltman et al. | |
| 8,561,642 B2 | 10/2013 | Schütz | |
| 8,985,145 B2 | 3/2015 | Oltman et al. | |
| 9,897,230 B2 | 2/2018 | Gong et al. | |
| 11,713,238 B2 * | 8/2023 | Huston | B67D 7/36 |
| | | | 222/240 |
| 2002/0109116 A1 | 8/2002 | Stolzman | |
| 2005/0067602 A1 | 3/2005 | Schutz | |
| 2013/0009085 A1 | 1/2013 | Kuzelka | |
| 2014/0251474 A1 | 9/2014 | Oltman et al. | |

\* cited by examiner

INTERMEDIATE BULK CONTAINER, VALVE AND CONNECTOR SYSTEM

CROSS-REFERENCE TO RELATED APPLICATIONS

This application is a Continuation of U.S. patent application Ser. No. 17/482,916, filed Sep. 23, 2021, which claims priority benefit of U.S. Provisional Patent Application Ser. No. 63/081,954 filed Sep. 23, 2020, entitled "INTERMEDIATE BULK CONTAINER, VALVE AND CONNECTOR SYSTEM," the complete disclosure of each of which, in its entirety is herein incorporated by reference.

BACKGROUND

Intermediate bulk containers, often referred to as IBC, are used to handle, store and transport bulk materials. Intermediate bulk containers are used for handling a wide variety of materials used in industry, which materials may be liquid or powder depending upon the IBC. Such intermediate bulk containers are reusable assemblies that include a container enclosure or tank that holds the material and is mounted on a base. The base typically is a pallet or pallet-like structure designed to be handled by a forklift, pallet jack or other similar material handling equipment. Intermediate bulk containers have also previously been referred to as IBC totes, IBC tanks, and pallet tanks. Intermediate bulk containers may be certified by the Department of Transportation for transport handling of different categories of products, and in size normally fall between that of a standard shipping drum and an intermodal tank container.

Intermediate bulk containers used in the handling of liquid product typically include a valve outlet that allows for the control of flow of the liquid. Such liquid flow control valves are normally located at the lower region of the container enclosure in order to provide for adequate drainage of the unit.

A problem associated with intermediate bulk containers is the proper connection and sealing of a liquid control valve with the tank. Leakage can provide a hazardous condition depending on the material being handled by the intermediate bulk container. Leakage may also result in damage to surrounding materials and require discarding the entire container contents. The present disclosure provides improvements.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The present disclosure is directed toward enhancing the seal of an intermediate bulk container valve assembly on the container. This is accomplished according to a preferred form of the present disclosure in a system that provides an intermediate bulk container with a valve assembly coupled thereto by a multipart connector system. The tank includes a tank outlet at a lower region of the container with an outlet orifice through the outlet. An outlet annular seal positioning wall extends from the outer end around the outlet orifice. The valve assembly is mounted on the tank outlet, with an inlet end region having an inlet orifice through a rearwardly facing seal surface. An inlet annular seal positioning wall extends from the inlet end region around the inlet orifice. The outlet annular seal positioning wall extends from the outer end a distance greater than the inlet annular seal positioning wall extends and the outlet annular seal positioning wall and inlet annular seal positioning wall are telescopingly mated. A sealing surface on the valve assembly is contacted by the outlet annular seal positioning wall when mounted on the tank. An elastomeric annular seal is positioned between the outer end and the inlet end region and positioned between the outlet annular seal positioning wall and inlet annular seal positioning wall. A multipart connector rotatably positioned around and coupling the inlet end region and outer end. A complete seal is formed between the annular seal and the annular seal positioning walls.

In some embodiments, the multipart connector comprises a first collar half and a second collar half, wherein the second collar half is substantially a mirror image of the first collar half. In a further embodiment, the first and second collar halves each comprise opposing radially extending elongated clamping tabs, each clamping tab having a contacting surface configured to abut the contacting surface of the other half. In another further embodiment, each clamping tab includes at least two holes that substantially align and configured to receive a fastener therethrough to join the first and second collar halves. In another further embodiment, the multipart connector comprises interior threads sized and shaped to engage with external threads of the outlet. In another further embodiment, the valve assembly includes a valve body having an inlet end and outlet end and an adaptor adjacent to an inlet end configured to form a leak resistant seal with the outlet of the intermediate bulk container, wherein the inlet annular seal positioning wall is integral to the adaptor. In another further embodiment, the adaptor includes a substantially rectangular base plate configured to abut with and mount to the inlet end of the valve body and a substantially cylindrical body extending from the base plate and terminating in an annular flange that forms a substantially circular connecting plate for sealingly engaging the outlet of the intermediate bulk container. In another further embodiment, the valve assembly comprises a ball valve. In another further embodiment, the valve assembly includes a valve body having an inlet end and outlet end and an outlet adaptor adjacent to the outlet end and configured to form a leak resistant seal therebetween, wherein the outlet adaptor includes a substantially cylindrical body that houses a ball, the ball configured to prevent fluid backflow through the outlet adaptor.

According to another aspect of the present disclosure the multipart connector is a split ring connector with internal threads that are threaded onto external threads on the tank outlet. The split ring connector is formed in at least two parts with joining tabs at each end to provide locking surfaces joined by fasteners. The split ring connector rotates on the valve assembly.

These and other objects, advantages, and features of the present disclosure will become apparent by review of the following specification in conjunction with the drawings.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
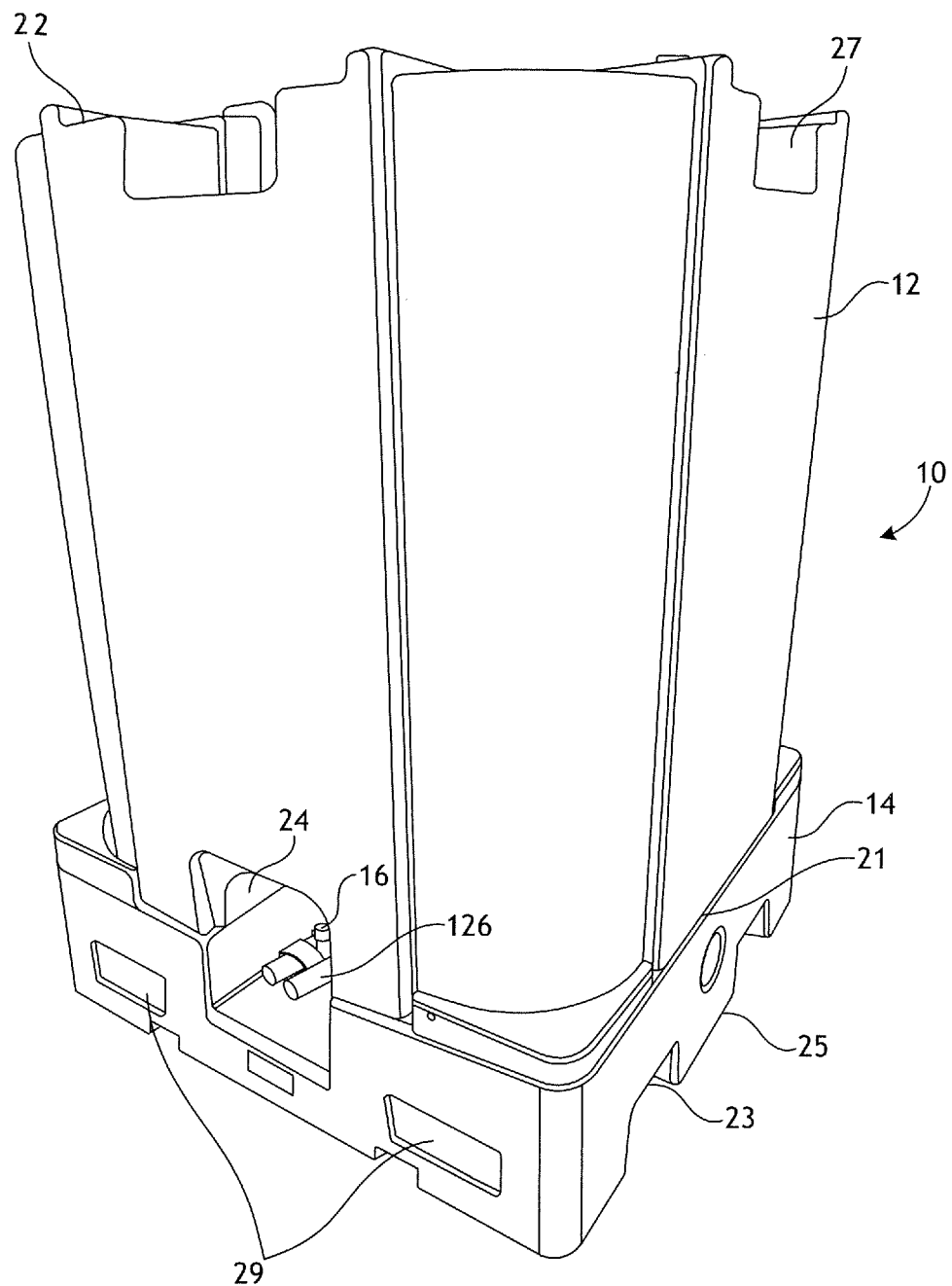
FIG. 1 is perspective view of an intermediate bulk container with a valve assembly and a multipart collar connector system in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

Referring now to FIG. 1, an intermediate bulk container or IBC 10 includes an enclosure or tank 12 mounted on a base illustrated as pallet 14. The tank 12 defines an interior volume configured to store a quantity of a liquid. In some embodiments, the tank 12 is configured to hold up to a volume of about 3 cubic meters (793 US Gal.) although capacities are generally between 1040 and 1,250 liters (275 and 330 Gal). In some embodiments, and as illustrated, the tank 12 is substantially cube-shaped. The IBC 10 also includes a valve assembly 16 coupled proximate to a lower end 21 of tank 12. The valve assembly 16 controls the outflow of liquid bulk material stored in the tank 12. In some embodiments, the IBC 10 is configured for stacking of multiple units. That is, an upper end 22 of tank 12 is configured to provide upper engaging surfaces that allow for stacking of another IBC on top of IBC 10, and at least partially mate with the lower engaging surfaces of pallet 14. For example, the upper end 22 may have a shape that is complementary to and configured to receive a bottom surface 23 of the pallet 14. The Pallet 14 is a rigid generally planar support structure that supports tank 12 and may include lower surface features configured to at least partially mate with the upper end 22 of tank 12 of another IBC. In some embodiments and as illustrated in FIG. 1, the bottom surface 23 of the pallet 14 may include at least one projection 25 configured to engage a substantially complementary recess 27 in the upper end 22.

The tank 12 is generally made of a material of sufficient structural rigidity to support the weight of another fully laden IBC stacked on top of tank 12. In some embodiments, the tank 12 is formed from a heavy-duty plastic material to provide a liquid impermeable enclosure for holding the liquid bulk material to be handled. In further embodiments, the tank 12 is composed of high-density polyethylene. It is to be appreciated that the material composition is not limiting and that other materials may be substituted herein, including, for example, composites and metals.

In some embodiments and as illustrated in FIG. 1, the pallet 14 includes fork receiving channels 29 that are located and shaped to accept forks (sometimes referred to as tines) of a forklift or other material handling device and provides structural rigidity to provide for the movement and handling of IBC 10 by the forklift. Alternatively and not illustrated, the IBC 10 may include a metal cage or other rigid enclosure that encloses tank 12 and provides the stacking support and a location for stacking another IBC on top of IBC 10.

Figure 2:
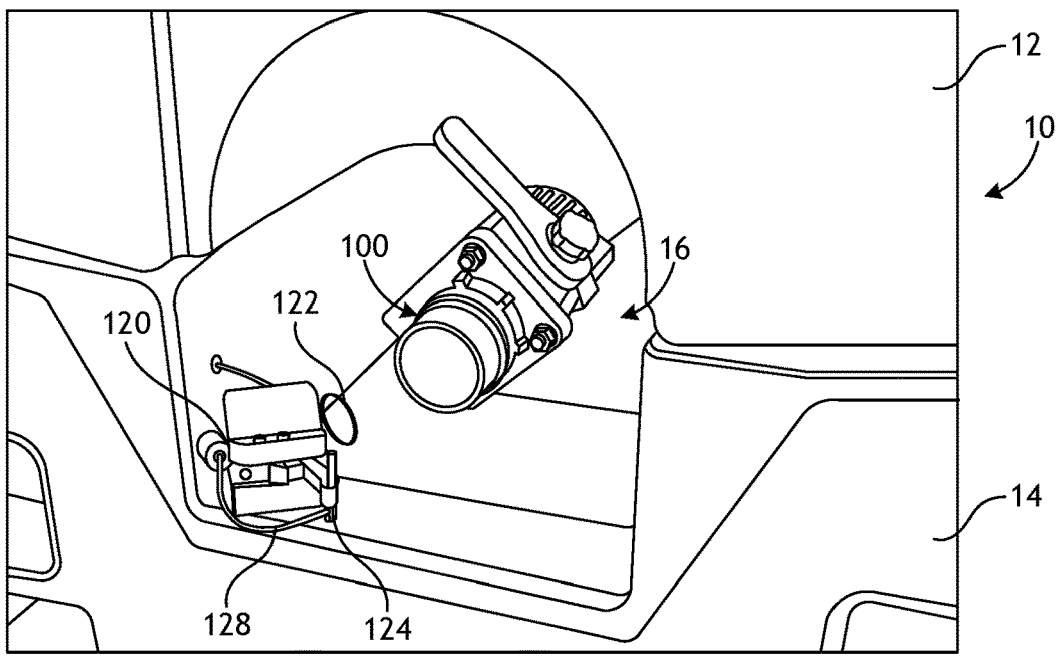
FIG. 2 is a fragmentary perspective view of the system of FIG. 1.
Figure 10:
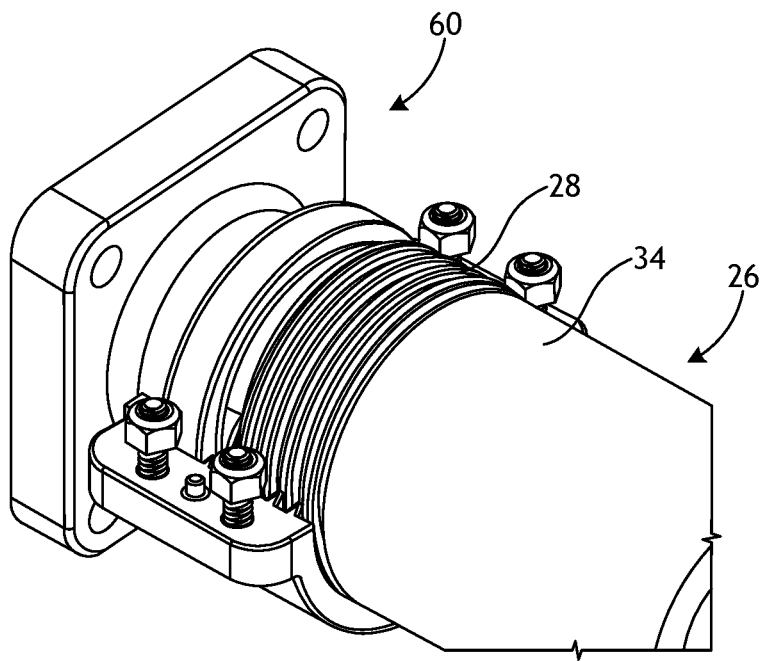
FIG. 10 is a rear perspective view of a part of the multipart connector system and adapter of FIG. 9 with the outlet of the industrial bulk container.

With reference to FIGS. 1 and 2, at a lower end 23 of tank 12, proximate the pallet 14 is an outlet recess 24 formed in part by complimentary regions of tank 12 and pallet 14. Recess 24 provides a coupling location for the valve assembly 16 in order to shroud and protect the valve assembly 16 from damage while in use for storage and during transport. At the lower end 23 of tank 12 is an outlet tube 26 that extends from a depending channel along the lower surface of tank 12 in order to provide for the complete drainage of tank 12. The outlet tube 26 may include sidewalls that are formed by extensions of the external surface of the tank 12. Alternatively, the outlet tube 26 may comprise a hole in the tank 12 and an annular flange that is secured about the hole. The flange extends away from the external surface of the thank wall to provide sidewalls of the outlet tube 26. The sidewalls of the outlet tube 26 provide a surface for removably connecting an accessory such as a valve assembly and/or spout. The outboard end of outlet tube 26 includes a set of external threads 28 illustrated in FIGS. 10 and 12). The external threads 28 are generally used to couple with multipart connector 18 as described in greater detail below.

The end-facing surface 30 of outlet tube 26 includes a ring seat 32 formed as a protruding circular flange. Ring seat 32 is an annular flange around the outlet of outlet tube 26 to provide a seating region for O-ring 20. The ring seat 32 has a generally cylindrical outer wall 34. That is, the annual outer wall 34 extends from the outer end-facing surface 30 of the outlet tube 26 and is configured to position a sealing member (o-ring). The O-ring 20 is configured to be compressed against the cylindrical outer wall 34 and end-facing surface 30 when valve assembly 16 is connected to the outlet tube 26 of the tank 12.

As described herein, a valve coupling system includes a multipart connector 18 carried on valve assembly 16 to couple valve assembly 16 with tank 12. An O-ring seal 20 is compressed between valve assembly 18 and tank 12 to provide a seal at the connection region. The configuration and structure of the multipart connector 18 and engaging regions of valve assembly 16 and tank 12 create a highly functional, complete seal and thus, mitigate if not eliminate leakage. The structure of the valve coupling system provides for rapid and ease of assembly onto IBC 10 with reduced error in the final assembly.

With reference to FIGS. 1-5, the valve assembly 16 includes a valve body 40 that encompasses a valve gate or ball 44. In the exemplary embodiment of FIG. 5, the valve assembly 16 is a ball valve and gate 44 is a ball gate. Alternatively, other forms of valves and valve gates may be used without departing from the scope of this disclosure. A set of gate seats 46 provide a complimentary surface upon which the outer surface of gate 44 rests, thereby forming a liquid impermeable barrier through valve body 40 when gate 44 is in the closed position. A handle 42 is connected to a stem 48 such that rotation of handle 42 also rotates stem 48. Stem 48 passes through a bonnet 56 which closes the opening through which gate 44 is assembled, and the lower end of stem 48 is connected to gate 44 such that rotation of stem 48 also rotates the gate 44 between an open or closed position. Therefore, rotation of handle 42 allows for gate 44 to be selectively rotated between an open or closed position. When in the open position, fluid enters the valve body 40 and passes through gate 44 before exiting the valve body 40.

To prevent unintended fluid flow, valve assembly 16 includes a handle locking button 50 with a depending pin 52 protruding from its lower surface. When the locking button 50 is depressed against a spring 54, the depending pin 52 engages handle 42 with stem 48. Handle 42 is configured to not rotatably engage stem 48 when button 50 is not depressed and depending pin 52 is not engaged. While depending pin 52 is engaged, handle 42 rotatably locks with stem 48 so that rotation of handle 42 rotates stem 48 in order to shift ball 44 between closed and open positions.

With reference to FIGS. 3, and 8-14, located at the inlet end of valve body 40 is an inlet adaptor 60 that cooperates in forming a leak resistant seal with outlet tube 26 on tank 12. The inlet adaptor 60 is formed with a generally square or rectangular base plate 62 that abuts with and mounts to valve body 40. In some embodiments, the base plate 62 mounts to the valve body 40 via fasteners. Integrally formed with plate 62 is a cylindrical body 64 that protrudes laterally. The cylindrical body 64 terminates in an annular flange 66 that forms a circular connecting plate. A forward anchoring surface 68 on flange 66 faces opposing base plate 62. The opposite rear-facing surface of flange 66 is a sealing surface 70 that engages end surface 30 on outlet tube 26. Protruding laterally around the inlet opening 71 of adaptor 60 is a ring seat 72. The ring seat 72 is an annular seal positioning wall extending from the sealing surface 70 and integrally formed with flange 66 as a cylindrical shape having planar sides that form a seat and engagement surface for O-ring seal 20.

With reference to FIGS. 3, 5, 6, 8-12 and 16-17 a multipart connector 18 is configured to couple the valve assembly 16 to the outlet tube 26 of tank 12. The multipart connector 18 includes two mating coupling collar halves 74. Collar halves 74 are generally mirror images, which combine to form a substantially circular collar used in the coupling of the outlet tube 26 and inlet adaptor 60. The inner surface of collar halves 74 include interior threads 76 sized and shaped to engage with the external threads 28 on the outlet tube 26. Extending radially from each end of each collar half 74 is an elongated clamping tab 78 that substantially extends along the width W of the collar half. Each clamping tab 78 includes holes 80 configured to align with the holes 80 of the opposed collar half 74 and receive a set of four connecting bolts 82 that join collar halves 74. In some embodiments, each clamping tab includes at least two holes 80. In some embodiments, the contacting surfaces of the clamping tabs 78 on one collar half 74 include positioning pegs 84 configured to engage peg seats 86 to aid in aligning each collar half 74. That is, a mating set of peg seats 86 on the clamping tabs 78 of the other collar half 74 mate with and engage pegs 84 to positively establish proper alignment and connection of collar halves 74 and speed assembly.

With reference to FIGS. 8-12 The outboard end of coupling collar halves 74 may include an annular lip 88. When assembled onto inlet adaptor 60, annular lip 88 protrudes between base plate 62 and connecting flange 66. The rearward-facing surface 89 of annular lip 88 engages against anchor surface 68 in order to draw adaptor 60 against end surface 30. The Annular lip 88 rotates freely around cylindrical body 64 as collar halves are threaded onto outlet threads 28.

Figure 15:
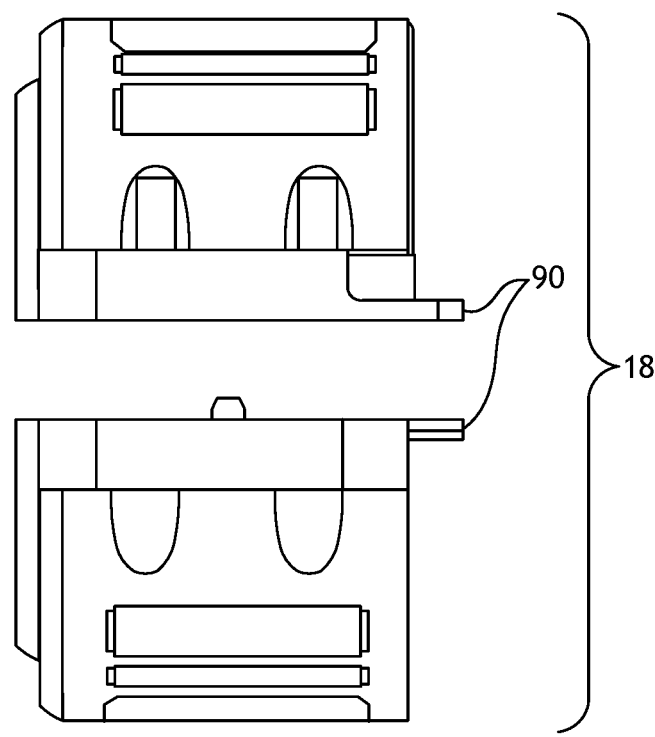
FIG. 15 is a side elevation view of separated parts of the multipart connector system of FIG. 4.
Figure 16:
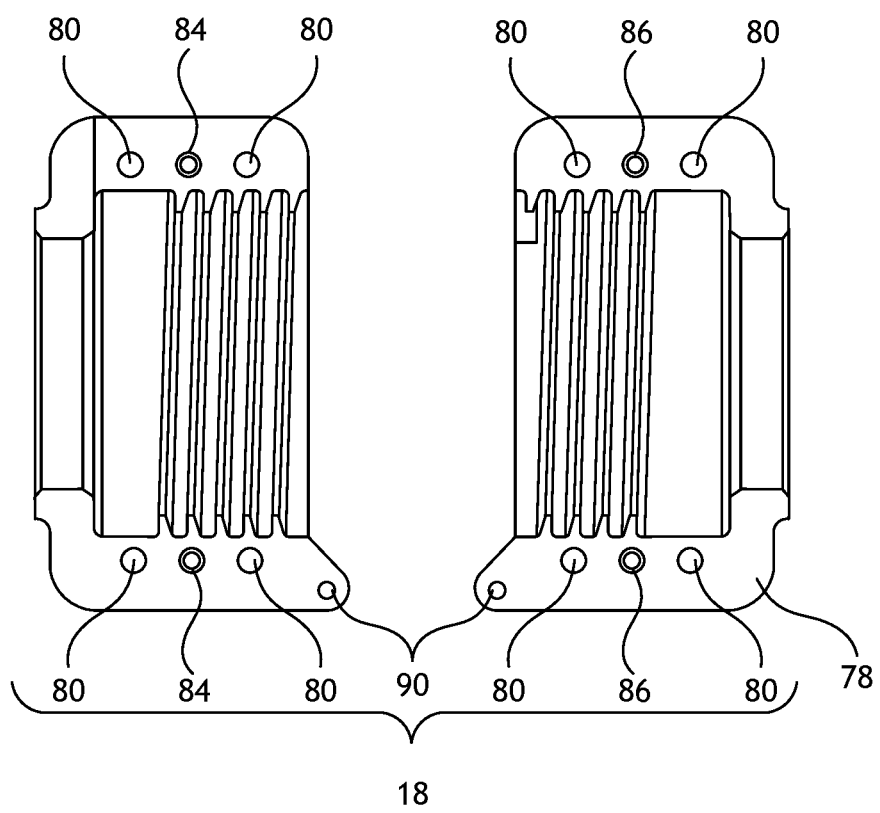
FIG. 16 is a plan view of separated parts of the multipart connector system of FIG. 4.
Figure 17:
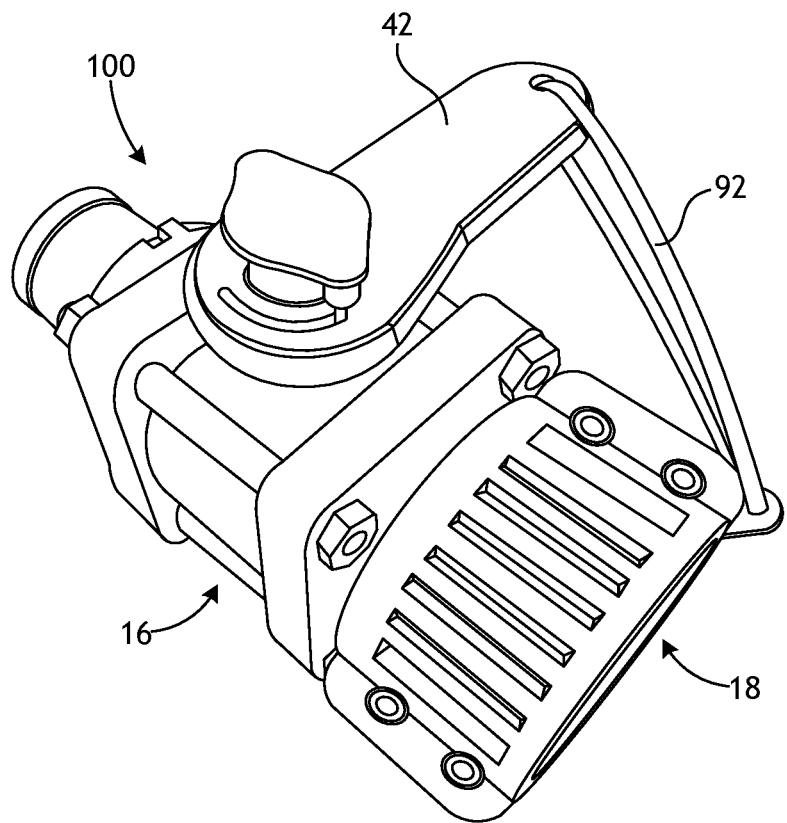
FIG. 17 is a perspective view of the valve assembly of FIG. 3 with a safety seal applied to the handle.

In some embodiments, the outer surface of the collar halves 74 is knurled or striated in order to provide a solid friction grip and provide for hand assembly of valve assembly 16 onto tank outlet 26. In some embodiments and with reference to FIGS. 15 and 16 extending rearwardly from one mating set of clamping tabs 78 is an end tab 90. End tab 90 may include an aperture which provides a connection point for a safety seal 92 (as illustrated in FIG. 17), which in turn couples with a hole in handle 42. The safety seal 92 provides a tamper seal to insure product is not improperly removed from the IBC 10, as well as may prevent unintended rotation of handle 42.

Figure 8:
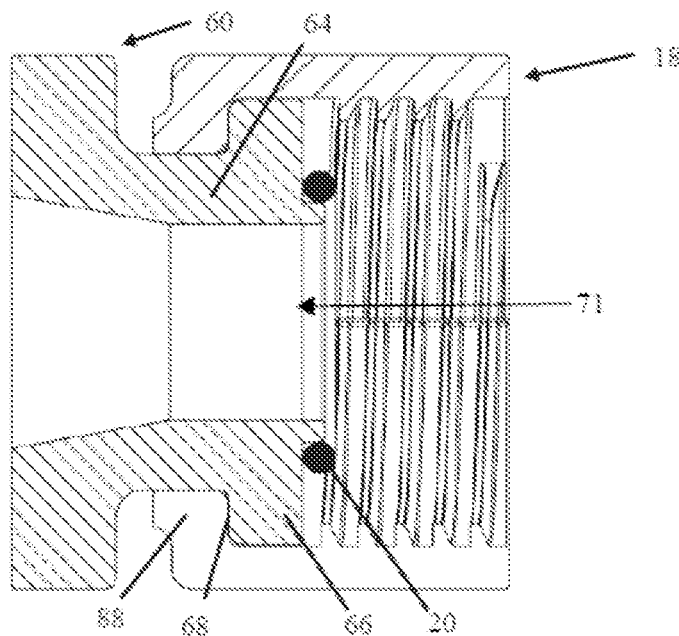
FIG. 8 is a side elevation cross-sectional view along plane A-A of FIG. 7.
Figure 9:
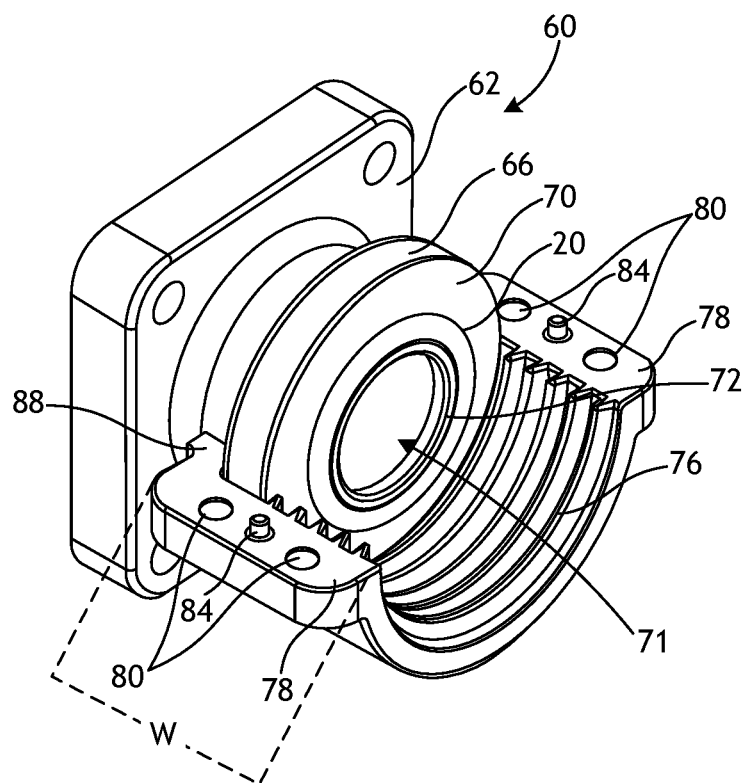
FIG. 9 is a rear perspective view of a part of the multipart connector system and adapter of FIG. 6.
Figure 11:
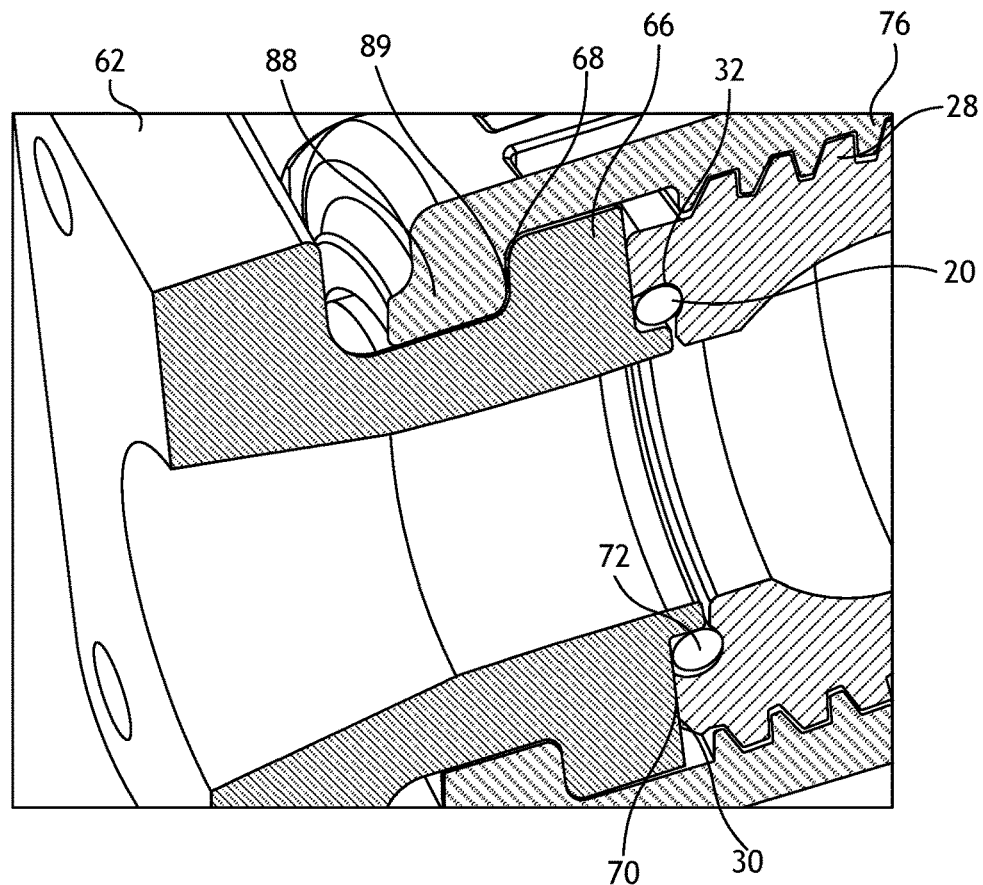
FIG. 11 is a perspective cross-sectional view of the multipart connector system and adapter with the outlet of the industrial bulk container.
Figure 12:
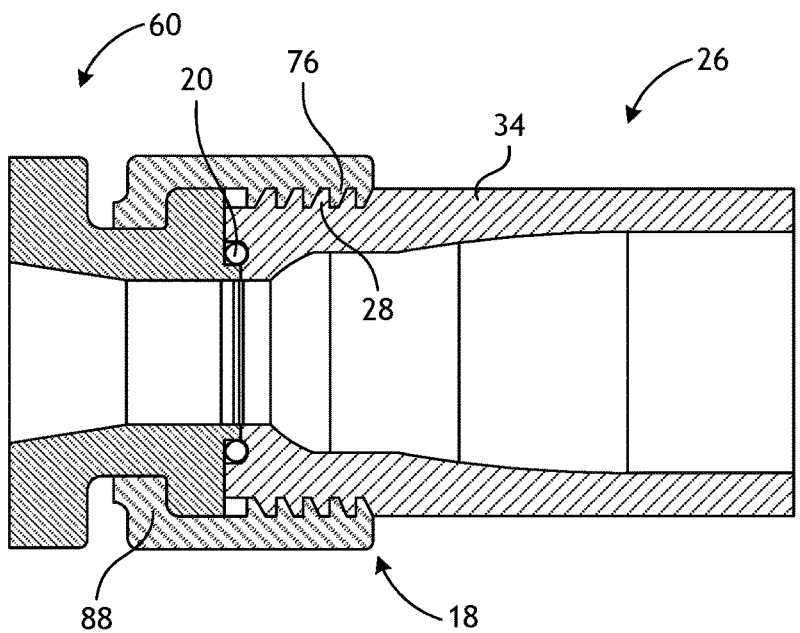
FIG. 12 is a side elevation cross-sectional view of the multipart connector system and adapter with the outlet of the industrial bulk container of FIG. 11.
Figure 13:
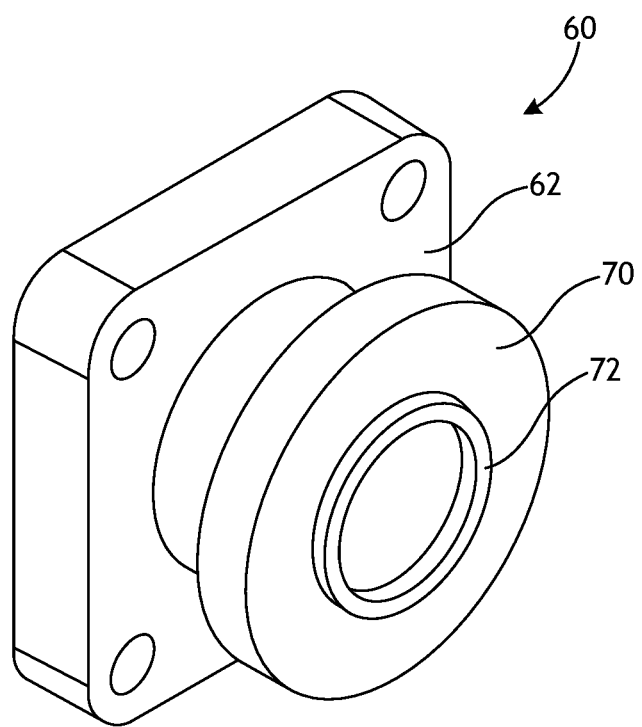
FIG. 13 is a rear perspective view of the adapter of FIG. 4.
Figure 14:
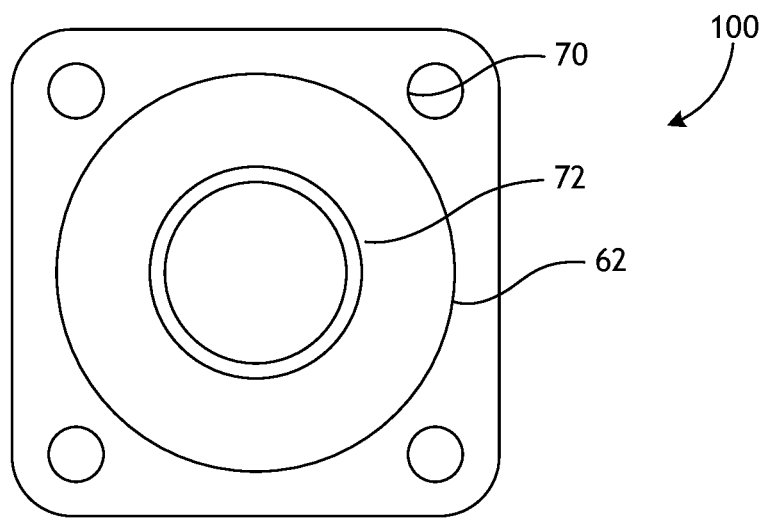
FIG. 14 is a rear elevation view of the adapter of FIG. 4.

With reference to FIGS. 8, 11 and 12, the ring seat 72 of inlet adaptor 60 may have a diameter less than that of ring seat 32 of the outlet tube 26. In these embodiments, when the valve assembly 16 is mounted on outlet tube 26 the ring seat 72 is positioned within ring seat 32 of the outlet tube. The cross-sectional diameter of the material making up O-ring 20 is greater than the protruding width of ring seat 32 on outlet 26 and is greater than the protruding width of ring seat 72 on inlet adaptor 60. The protruding width of ring seat 32 on outlet 26 is greater than the protruding width of ring seat 72 on inlet adaptor 60. End surface 30 therefore makes positive contact and fully engages with sealing surface 70 while the ring seat 72 is out of contact with outlet 26. This provides complete compression and sealing by O-ring 20 and a complete sealing engagement between O-ring 20, end surface 30, and sealing surface 70.

Figure 5:
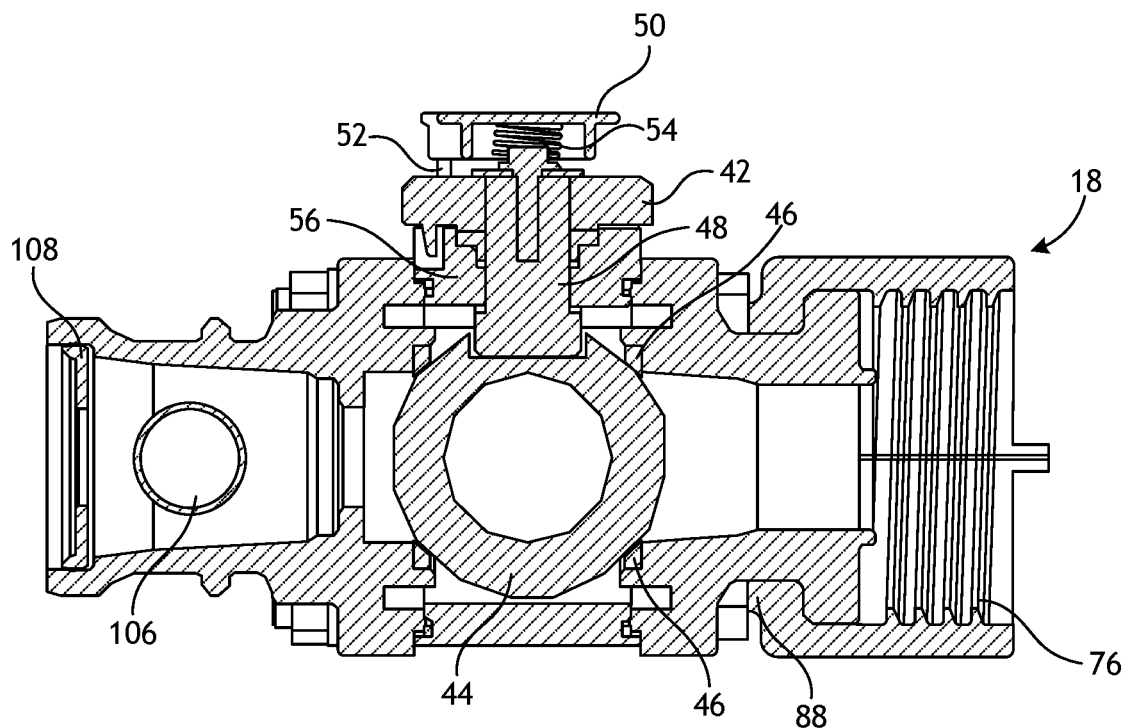
FIG. 5 is a side elevation cross-sectional view of the valve assembly and multipart connector system of FIG. 4.
Figure 6:
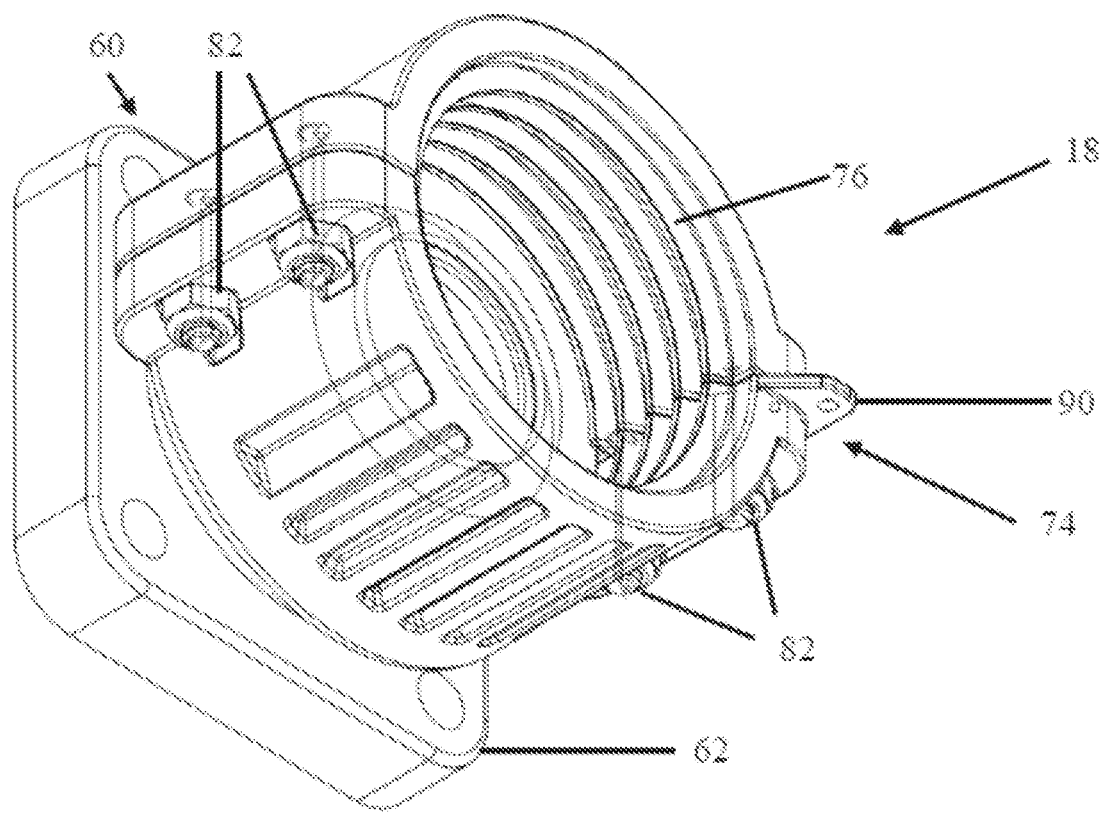
FIG. 6 is a rear perspective view of the multipart connector system and adapter of FIG. 4.
Figure 7:
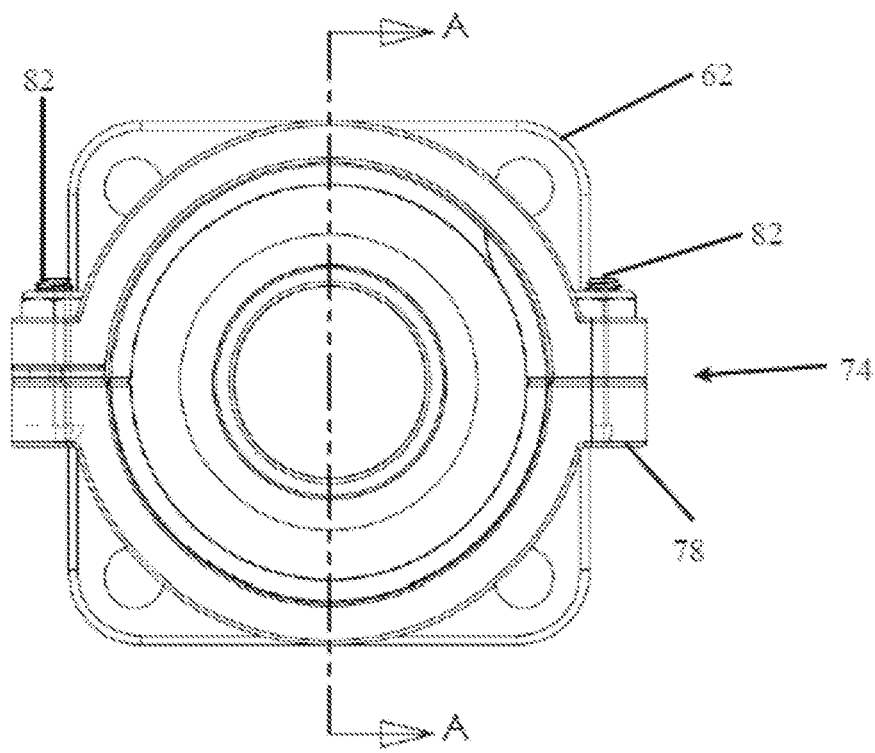
FIG. 7 is an end elevation view of the multipart connector system and adapter of FIG. 6.

With reference to FIG. 5, the outlet of valve body 40 may include outlet adaptor 100 that forms a leak resistant seal with the outlet of the valve body 40. The outlet adaptor 100 may be formed with a generally square or rectangular base plate 102 that abuts with and mounts to valve body 40. The Outlet adaptor 100 includes a cylindrical body 104 that houses a ball 106 configured to prevent fluid backflow through the adaptor 100. In the event of fluid backflow, the force exerted by the fluid pushes ball 106 into the inlet opening of outlet adaptor 100 such that ball 106 covers the inlet opening to the outlet adaptor and forms a liquid impermeable barrier that prevents fluid backflow into the valve body 40.

Figure 4:
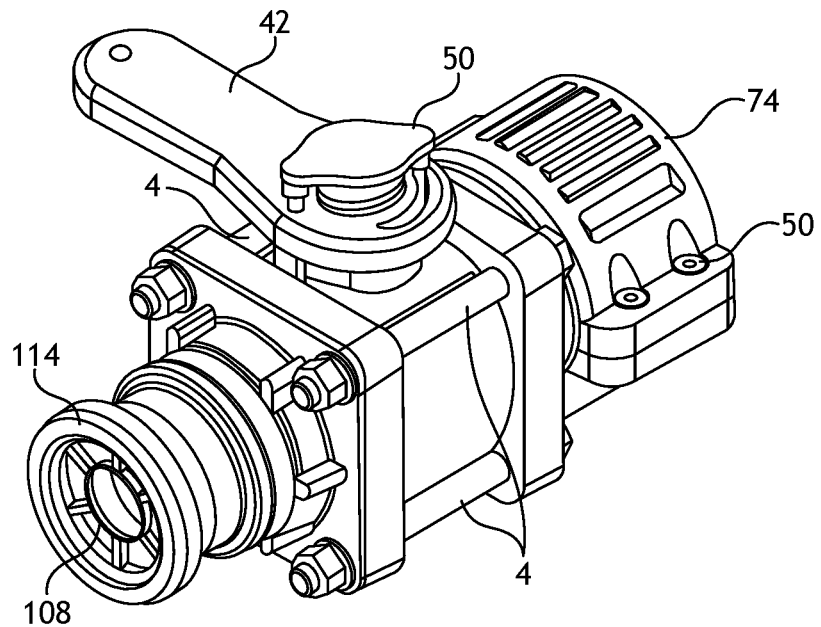
FIG. 4 is a frontal perspective view of another exemplary valve assembly and multipart connector system in accordance with the present disclosure.

In some embodiments and with reference to FIGS. 4 and 5, a grate 108 within the outlet of the outlet adaptor 100 provides a stop for ball 106, and prevents the ball 106 from dislodging from the outlet adaptor 100. While fluid is flowing through the outlet adaptor 100 from the outlet adapter inlet to the outlet adaptor outlet, the fluid flow pushes ball 106 into grate 108. Grate 108 seats ball 106 while still allowing fluid to flow around the outer surface of the ball 106 and through the outlet of the outlet adaptor 100. Just as the ball 106 functions to prevent fluid backflow into the valve body 40, alternatively an outlet backflow check valve 110 or an alternative check valve 112 may similarly be located in the cylindrical body 104 and used for similar function preventing unintended backflow through valve assembly 16.

With reference to FIGS. 2, 4 and 5, the outlet of outlet adaptor 100 also includes a narrowed cylindrical cap locking region 114 which is configured to lock a cap 120 over the outlet of adaptor 100. Cap 120 fits over the outboard end of adaptor 100 and forms a removable closure with a liquid impermeable barrier at the outlet of outlet adaptor 100. Cap 120 carries a set of locking levers 124 that, once the cap 120 is seated on the cap locking region 114, may be pivoted to a closed position. On each of levers 124 is an eccentric raised surface that protrudes into cap locking region when pivoted to the closed position and seat against adaptor 100. When used in this manner, the locking levers 124 act as a lever by pushing against a flange on the cap locking region 114 and simultaneously compress the cap 120 against the cap locking region 114, thereby creating a liquid impermeable barrier. The locking levers 124 also each carry at their free end a locking seal ring 122 which, when locking levers 124 are in the locked position, allow for the placement a band or seal 126, thereby creating a tamper-evident seal for cap 120. In some embodiments, a lanyard 128 is connected to pallet 14 that run through a hole in a protrusion of cap 120, thereby preventing accidental loss of the cap 120.

Figure 3:
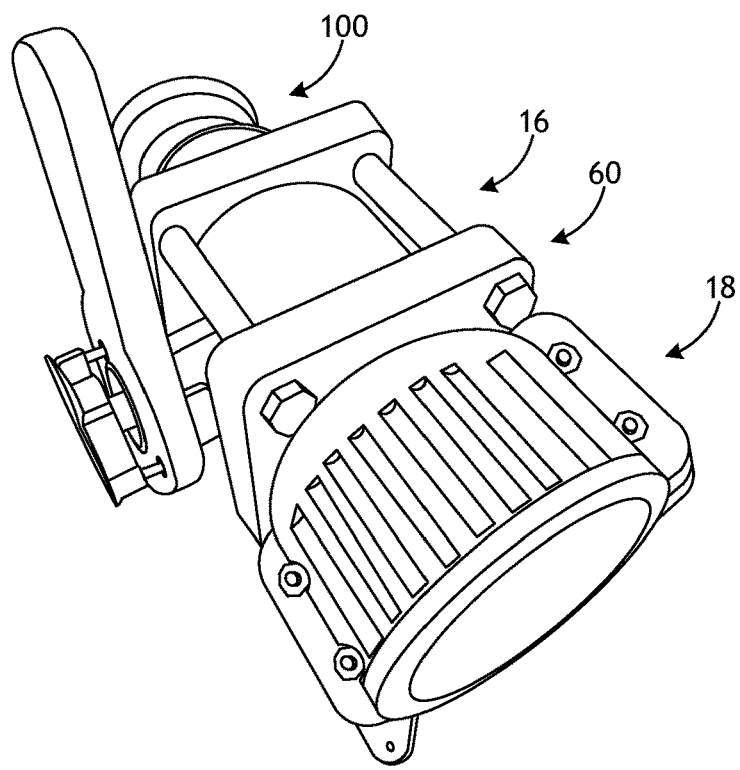
FIG. 3 is a rear perspective view of the valve assembly and connector of FIG. 1.

With reference to FIGS. 3-5 the valve assembly 16 includes a set of body connecting bolts 4 extend through and compress together the inlet adaptor plate 62 and the outlet adaptor plate 102. Because the valve assembly 16 is positioned between the inlet adaptor plate 62 and the outlet adaptor plate 102, the resulting compression enhances the seal between the valve assembly 16 and each of the inlet adaptor 60 and the outlet adaptor 100.

Also described herein is a method of sealing a valve assembly to an outlet of an intermediate bulk container. The valve assembly may be the same as the valve assembly 16 described above, and the tank and the outlet thereof may be the same as the tank 12 and the outlet 26 detailed above. The method comprises locating an annular seal member on the valve assembly such that the annular seal member engages a lateral sealing surface of the valve assembly. The method also includes threading a connector of the of the valve assembly onto an outlet tube of the intermediate bulk container to draw the sealing surface and the annular seal member laterally toward a lateral end-facing surface of the outlet tube, and compressing the annular seal between the lateral sealing surface and the lateral end-facing surface of the outlet tube. In embodiments, the method may include coupling the connector around an annular flange of the valve assembly by joining two opposed collar halves of the connector such that an annular lip of the connector engages an anchoring surface of the valve assembly opposite the lateral sealing surface. In embodiments, locating the annular seal member on the valve assembly includes engaging the annular seal member on a first radial side thereof with a ring seat extending laterally from the sealing surface; and, in such embodiments, drawing the annular seal member laterally toward the lateral end-facing surface of the outlet tube includes engaging the annular seal member on a second radial side thereof with a ring seat of the lateral end-facing surface. In embodiments, the method further comprises engaging the ring seat of the end-facing surface with the sealing surface.

Changes and modifications in the specifically described embodiments can be carried out without departing from the principles of the present invention, which is intended to be limited only by the scope of the appended claims, as interpreted according to the principles of patent law including the doctrine of equivalents.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. An intermediate bulk container, comprising:
   a tank defining an interior volume for storage of a bulk material;
   an outlet tube extending from the interior volume of the tank to an outlet at an outboard end of the outlet tube, the outlet tube defining a lateral end-facing surface at the outboard end thereof;
   a valve assembly operable to control an outflow of the bulk material from the interior volume of the tank, the valve assembly having an inlet opening fluidly coupled to the outlet of the outlet tube and an annular flange circumscribing the inlet opening of the valve assembly, the annular flange including a lateral sealing surface facing the lateral end-facing surface of the outlet tube and a lateral anchoring surface opposite the lateral sealing surface;
   an annular seal member disposed between the lateral end-facing surface of the outlet tube and the lateral sealing surface of the annular flange; and
   a connector rotatably coupled to the valve, the connector including an annular lip engaging the anchoring surface of the annular flange such that engagement of threads of the connector with the corresponding threads on the outlet tube draws the sealing surface laterally toward the lateral end-facing surface of the outlet tube to compress the annular seal therebetween.

2. The intermediate bulk container of claim 1, wherein the lateral end-facing surface includes an annular ring seat engaging the annular seal member on a first radial side thereof, and wherein the annular flange includes a ring seat extending from the sealing surface and radially engaging the annular seal member on a second radial side thereof opposite the first radial side.

3. The intermediate bulk container of claim 2, wherein the ring seat of the lateral end-facing surface engages the sealing surface and wherein the ring seat extending from the sealing surface is spaced from the lateral end-facing surface.

4. The intermediate bulk container of claim 3, wherein the ring seat of the lateral end-facing surface engages sealing surface along a greater radial width than a radial width of the ring seat extending from the sealing surface.

5. The intermediate bulk container of claim 1, wherein the connector is a split ring connector including two opposed collar halves joined to one another at respective clamping tabs extending along each of the collar halves.

6. The intermediate bulk container of claim 5, wherein the clamping tabs each include aligned holes extending therethrough for receiving a fastener, and wherein a first one of the tabs includes a positioning peg protruding into a peg seat on a second one of the tabs.

7. The intermediate bulk container of claim 1, further comprising a pallet supporting the tank thereon, and wherein the valve assembly is tethered to the pallet.

8. The intermediate bulk container of claim 1, wherein the outlet tube is formed from external surfaces of the tank.

9. A valve assembly for connection to an outlet of an intermediate bulk container, the valve assembly comprising:
- a valve body having an inlet end and outlet end;
- a gate within the valve body, the gate selectively movable between an open position in which the gate permits fluid flow through the valve body a closed position wherein the gate obstructs fluid flow through the valve body;
- an inlet adaptor coupled to the inlet end of the valve body, the inlet adaptor including an inlet opening and an annular flange circumscribing the inlet opening, the annular flange including a lateral sealing surface and a lateral anchoring surface opposite the lateral sealing surface;
- an annular seal member supported on the lateral sealing surface of the annular flange and circumscribing the inlet opening; and
- a connector rotatably coupled to the annular flange, the connector including an annular lip engaging the anchoring surface of the annular flange such that engagement of threads of the connector with corresponding threads on the intermediate bulk container draws the sealing surface laterally toward the intermediate bulk container to compress the annular seal between the sealing surface and a lateral surface of the intermediate bulk container.

10. The valve assembly of claim 9, wherein the annular seal member is an elastomeric o-ring.

11. The valve assembly of claim 10, wherein the annular seal is (Original) positioned around a ring seat extending laterally from the sealing surface of the annular flange.

12. The valve assembly of claim 11, wherein the annular flange and the ring seat are integral to the inlet adaptor.

13. The valve assembly of claim 9, wherein the connector is a split ring connector including two opposed collar halves selectively separable from one another.

14. The valve assembly of claim 13, wherein the threads of the connector are interior threads defined on combined surfaces of the two opposed collar halves.

15. The valve assembly of claim 14, wherein a first one of the connector halves includes a positioning peg protruding into a peg seat on a second one of the connector halves to align the threads on the combined surfaces of the two opposed collar halves.

16. A method of sealing a valve assembly to an outlet of an intermediate bulk container, the method comprising:
- locating an annular seal member on the valve assembly such that the annular seal member engages a lateral sealing surface of the valve assembly;
- threading a connector of the valve assembly onto an outlet tube of the intermediate bulk container to draw the sealing surface and the annular seal member laterally toward a lateral end-facing surface of the outlet tube;
- coupling the connector around an annular flange of the valve assembly by joining two opposed collar halves of the connector such that an annular lip of the connector engages an anchoring surface of the valve assembly opposite the lateral sealing surface; and
- compressing the annular seal between the lateral sealing surface and the lateral end-facing surface of the outlet tube.

17. The method of claim 16, wherein locating the annular seal member on the valve assembly includes engaging the annular seal member on a first radial side thereof with a ring seat extending laterally from the sealing surface.

18. The method of claim 17, wherein drawing the annular seal member laterally toward the lateral end-facing surface of the outlet tube includes engaging the annular seal member on a second radial side thereof with a ring seat of the lateral end-facing surface.

19. The method of claim 18, further comprising engaging the ring seat of the end-facing surface with the sealing surface.

* * * * *